(12) United States Patent
Bellala et al.

(10) Patent No.: US 10,547,592 B2
(45) Date of Patent: Jan. 28, 2020

(54) COMPUTING A GLOBAL SUM THAT PRESERVES PRIVACY OF PARTIES IN A MULTI-PARTY ENVIRONMENT

(71) Applicant: HEWLETT PACKARD ENTERPRISE DEVELOPMENT LP, Houston, TX (US)

(72) Inventors: Gowtham Bellala, Redwood City, CA (US); Shagufta Mehnaz, West Lafayette, IN (US)

(73) Assignee: Hewlett Packard Enterprise Development LP, Houston, TX (US)

(*) Notice: Subject to any disclaimer, the term of this patent is extended or adjusted under 35 U.S.C. 154(b) by 368 days.

(21) Appl. No.: 15/410,714

(22) Filed: Jan. 19, 2017

(65) Prior Publication Data

US 2018/0205707 A1 Jul. 19, 2018

(51) Int. Cl.
*H04L 29/06* (2006.01)

(52) U.S. Cl.
CPC .............. *H04L 63/0421* (2013.01)

(58) Field of Classification Search
CPC ....... H04L 63/0421; H04L 9/085; H04L 9/08; H04L 9/0816; H04L 9/0861; H04L 2209/46; H04L 9/0855; G05B 2219/33077
See application file for complete search history.

(56) References Cited

U.S. PATENT DOCUMENTS

| 2002/0007457 | A1 | 1/2002 | Neff et al. | |
|---|---|---|---|---|
| 2009/0177894 | A1* | 7/2009 | Orsini ................. | G06F 21/6209 713/193 |
| 2015/0135329 | A1* | 5/2015 | Aghasaryan .......... | H04L 67/306 726/26 |

FOREIGN PATENT DOCUMENTS

WO  WO-2013001021  1/2014

OTHER PUBLICATIONS

Jangde, P. et al.; "Hybrid Technique for Secure Sum Protocol"; 2011; 4 pages.
Rautaray, J. et al.; "Star Topological Secure Sum Protocol with Trusted Third Party"; 2013; 4 pages.
Zhang. et al.; "Collusion-free Rational Secure Sum Protocol"; Jul. 2013; 2 pages.

(Continued)

*Primary Examiner* — Huan V Doan
(74) *Attorney, Agent, or Firm* — Hewlett Packard Enterprise Patent Department

(57) ABSTRACT

The present disclosure discloses a method comprising: dividing, by a computing device at a first party among a plurality of parties, local data into a plurality of data segments; recursively encrypting, by the computing device, each data segment using a plurality of public keys corresponding to the plurality of parties and a mediator; sharing, by the computing device, the local data comprising the encrypted plurality of data segments with the mediator; anonymizing, by the computing device, aggregated local data received from the mediator; and communicating, by the computing device from the mediator, a global sum that preserves privacy of the plurality of parties in a multi-party environment, wherein the global sum is computed by the mediator based on the collection of data segments that are decrypted recursively using the private key corresponding to each party and the private key corresponding to the mediator.

18 Claims, 11 Drawing Sheets

(56) References Cited

OTHER PUBLICATIONS

Ashrafi et al., Collusion-resistant Anonymous Data Collection Method, Proceedings of the 15th ACM SIGKDD International Conference on Knowledge Discovery and Data Mining, Jun. 28-Jul. 1, 2009, pp. 69-77.
Clifton et al., "Tools for Privacy Preserving Distributed Data Mining", ACM SIGFDD Explorations Newsletter, vol. 4, Issue 2, 2002, pp. 28-34.
Sheikh et al., "A Distributed k-Secure Sum Protocol for Secure Multi-Party Computations", Journal of Computing, vol. 2, Issue 3, Mar. 2010, Issn 2151-9617, pp. 68-72.
Sheikh et al., "Privacy Preserving K-Secure Sum Protocol", (IJCSIS) International Journal of Computer Science and Information Security, vol. 6, No. 2, 2009, pp. 184-188.

* cited by examiner

COMPUTING A GLOBAL SUM THAT PRESERVES PRIVACY OF PARTIES IN A MULTI-PARTY ENVIRONMENT

BACKGROUND

Sometimes, multiple parties, each owning some data, want to collaborate with each other while preserving the privacy of their own data in the meantime. In order to run analytics on multi-party data in a privacy preserving manner, various protocols are used as building blocks in data mining. Conventionally, round-robin protocols based on randomization may be used by the multiple parties under the honest-but-curious model. However, such protocols generally are not secure and tend to leak information when more than two parties collude. Also, the multiple parties may communicate with a third-party trusted mediator for analytic data and result sharing, which makes the third-party trusted mediator a weak link in the security chain. On the other hand, peer-to-peer secure protocols often involve complex computation and back-and-forth messaging between the multiple parties. Hence, it is difficult to scale these peer-to-peer secure protocols to big data analytics due to computational complexities, especially when more than two parties participate in the communications.

BRIEF DESCRIPTION OF THE DRAWINGS

The following detailed description references the drawings, wherein.

DETAILED DESCRIPTION

Figure 1A:
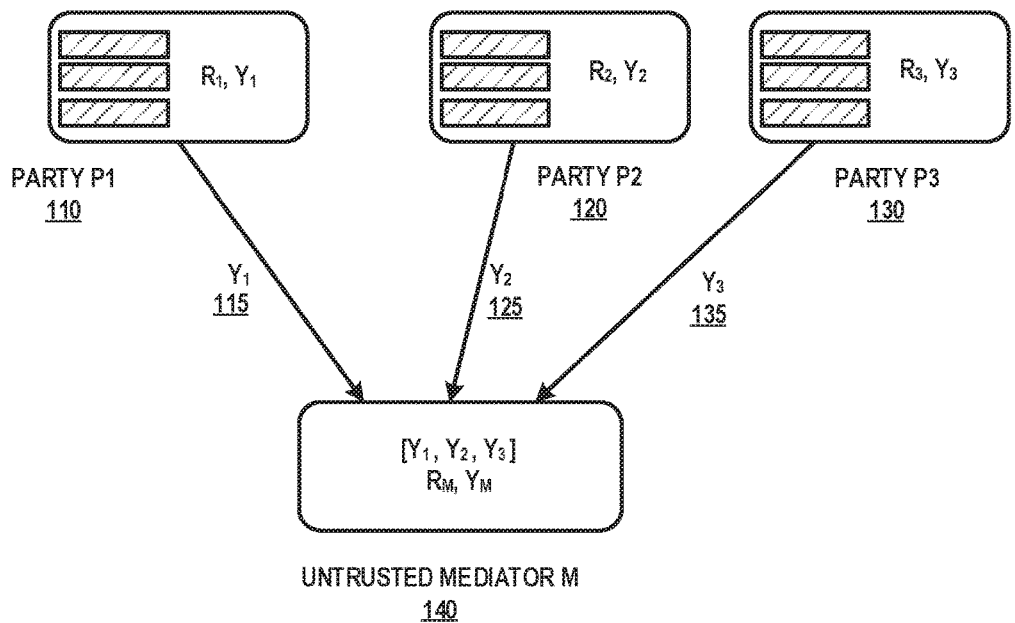
FIGS. 1A-1B are block diagrams of an example threat model and secure protocol used by multiple parties and a non-trusted mediator to communicate a sum that preserves privacy of the multiple parties in a multi-party environment.

In the following description, details are presented to provide a detailed description. Concepts and techniques disclosed herein can be practiced without one or more of the specific details, or in combination with other components, etc. As used herein, the term "implementation" generally refers to an implementation that serves to illustrate by way of example but not limitation. It should be understood that this disclosure covers all modifications, equivalents, and alternatives falling within the spirit and scope of the present disclosure.

Overview

The present disclosure relates to multi-party data mining. In particular, the present disclosure relates to securely computing a global sum of data across the multiple parties in a multi-party environment while preserving their data privacy. Specifically, the present disclosure involves a secure-sum protocol that serves as a building block to perform data analytics on multi-party data in a privacy-preserving fashion.

One challenge in data-driven enterprises is how to extract information from a dataset that can facilitate good business decisions, without sacrificing the privacy of the individuals or organizations whose sensitive details may be contained in the dataset. This challenge is compounded when the analysis involves multiple parties (or organizations) which want to collaborate with each other in order to obtain a broader understanding of a topic of mutual interest.

For example, a group of hospitals may want to work together to improve their collective quality of healthcare. Each hospital may has collected a lot of data about its own patients, including their demographics, past medical history, lab results, current diagnosis, prescribed treatment and outcomes, etc. This data contains a lot of information that, if shared across the group, could mutually benefit parties in the group, allowing faster diagnosis and effective treatment for similar cases. However, this data also contains sensitive and private information both about the patients and about the hospitals. Thus, sharing this sort of data can be problematic due to regulatory reasons.

In general, this class of scenarios arises when a dataset containing private information belongs to multiple parties, and the parties collectively want to perform analytics on the entire dataset while respecting the privacy and security concerns of each individual party. It may occur in a variety of applications ranging from healthcare to the Internet-of-things (IoT). Existing solutions often rely on a trusted third-party mediator with whom each party has to share its raw data. Then, the trusted third-party mediator performs analytics on global data and shares the final results. However, these third-party vendors are often the weak link in the security chain and may breach privacy of the organization. The solution provided herein involves a non-trusted mediator, with whom each party shares only encrypted results. The non-trusted mediator aggregates these results directly in the encrypted domain without having access to raw data values, thereby minimizing or potentially eliminating breach of data.

Specifically, a secure-sum protocol is more secure compared to existing protocols. While existing protocols tend to leak information when multiple parties collude, the secure-sum protocol disclosed herein can be secure with up to N−2 parties colluding, where N indicates the total number of parties collaborating in the analysis.

Threat Model

Figure 1B:
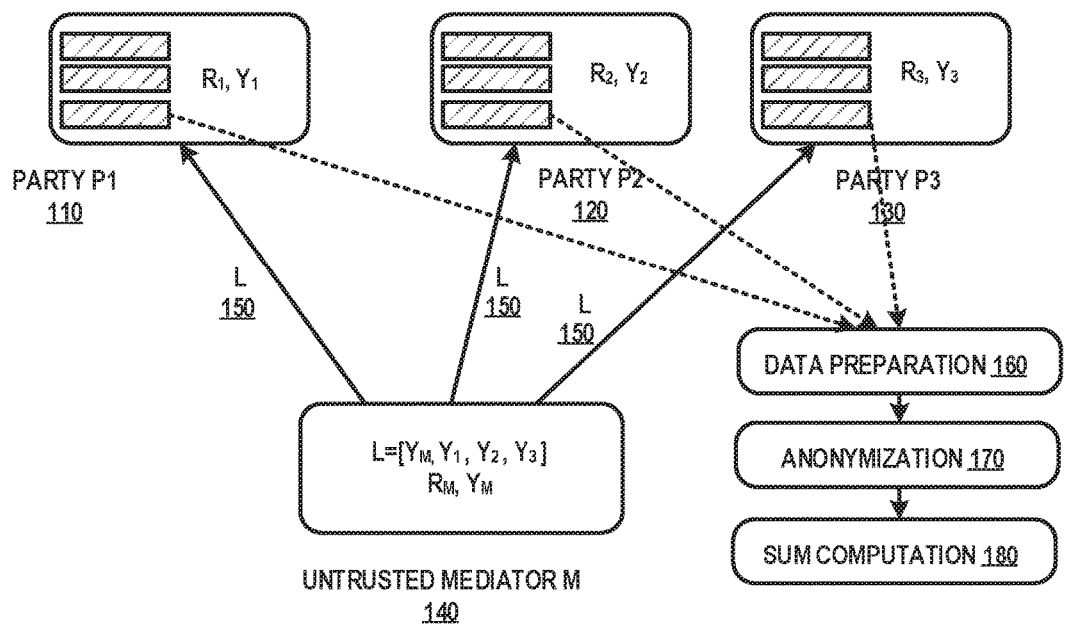

FIGS. 1A-1B are block diagrams of an example threat model and secure protocol used by multiple parties and a non-trusted mediator to compute a global sum of data across the multiple parties in a multi-party environment while preserving their data privacy. In this example, the threat model involves an honest but curious (e.g., semi-honest) adversary model rather than a malicious model. Under the malicious threat model, parties may commit malicious acts, for example, sending incorrect information when collecting with other parties. By contrast, under the honest but curious mode, a party can follow the protocol without malicious behaviors, but may try to acquire as much information as possible about other parties' private data during the computation. Thus, it is possible for a party to commit non-malicious attacks, such as, collusion attacks.

The collusion-resistant data anonymization may be achieved by randomly permuting the data (or segments of the data) submitted by the multiple parties. This anonymization provides that the mediator along with the colluding semi-honest parties cannot breach an honest party's data anonymity as long as the adversary has control over at most (N−2) parties.

FIGS. 1A-1B include a non-trusted mediator 140 and multiple parties, such as, party P1 110, party P2 120, and party P3 130. In this example, each party (P1 110, P2 120, or P3 130) has its own private data, e.g., a value. The goal of the computation is to seek a sum of the values from the three parties P1 110, P2 120, and P3 130.

First, each party and the non-trusted mediator generates a pair of keys, including a public key Y and a private key R. Each party may share its public keys with the non-trusted mediator and other parties, but may store its private key such that the private key is only known to the party creating the key. As illustrated in FIG. 1A, P1 110 generates a public key $Y_1$ and a private key $R_1$; P2 120 generates a public key $Y_2$ and a private key $R_2$; and, P3 130 generates a public key $Y_3$ and a private key $R_3$. Furthermore, P1 110, P2 120, and P3 130 may share with non-trusted mediator M 140 their respective public key $Y_1$ 115, $Y_2$ 125, and $Y_3$ 135.

Similarly, non-trusted mediator M 140 also creates a private key $R_M$ and a public key $Y_M$. Also, non-trusted mediator M 140 may store the private key $R_M$ in a place accessible only to itself. After receiving the public keys from the parties participating in the collaboration, non-trusted mediator M 140 can generate a collection of public keys L=$[Y_M, Y_1, Y_2, Y_3]$ 150, and can share L with each participating party (e.g., parties P1 110, P2 120, and P3 130).

Under the protocol, each party divides its own data (e.g., a value) into multiple segments, which are represented by the shaded blocks in FIGS. 1A-1B. The segmented data may be encrypted using at least one public key from L 150 before being shared with other parties and/or non-trusted mediator 140. Under the protocol described herein, parties generally do not transmit data to another party (P1 110, P2 120, or P3 130) or non-trusted mediator M 140 without any encryption. Data from each party may generally go through three distinct phases under the secure protocol that involves at least data preparation 160, anonymization 170, and sum computation 180.

In the data preparation phase 160, each party can prepare its data for submission to the non-trusted mediator. This phase includes at least two operations: The first operation involves sharding the data into a number of segments. The second operation involves recursively encrypting the data segments with the public keys of mediator M 140 and the multiple parties (assuming N parties).

In the anonymization phase 170, the mediator M 140 sends the set of prepared data to the Nth party (e.g., party P3 130). Here, the Nth party indicates the party to which the last shared public key belongs to. Then, the Nth party can perform decryption, then shuffle on the prepared data set and send randomly shuffled data to the (N−1)th party (e.g., party P2 120). The (N−1)th party can then further decrypt and shuffle the data segments, and this process continues until the data is decrypted and shuffled by the 1st party (e.g., party P1 110). Finally, the mediator M receives anonymized data from the 1st party (e.g., P1 110) with only one layer of encryption using the mediator M's public key.

As used herein, "shuffling on the prepared data set" generally involves randomly rearranging the order of data segments within the prepared data set. As used herein, "anonymizing data" generally refers to removing identifying attributes from the data, for example, by reordering and/or encrypting the data that were owned by multiple participating parties. As used herein, a "party" generally refers to a data entity as represented by at least one computing device hosting a private data set. As used herein, a "mediator" generally refers to a non-trusted entity as represented by at least one computing device to which each participating party is willing to share its data set with in an encrypted form. Note that because the "mediator" here is a non-trusted entity, parties will not share their private data set with the mediator in the plain text form.

In sum computation phase 180, the mediator M decrypt the data segments using its own secret key and computes the sum. Then, the mediator M can share the sum with the N parties (e.g., P1 110, P2 120, and P3 130). Each of these data processing phases will be described in details in the sections below.

Data Preparation

FIGS. 2A-2D are block diagrams illustrating data preparation in an example secure protocol used by the multiple parties and a non-trusted mediator (e.g., M 240) to compute a global sum of data across the multiple parties (e.g., P1 210, P2 220, and P3 230) while preserving their data privacy. Under the protocol, each party divides its own value into multiple segments. For example, assuming that party P1 210 has a value of 100. P1 210 may divide the value into three segments, e.g., 20, 50, and 30 respectively. In the example illustrated in FIGS. 2A-2D, party P1 210 can divide its value into two segments, such as, $\beta_1$, $\gamma_1$ 215. Similarly, party P2 220 can divide its value into two segments, such as, $\beta_2$, $\gamma_2$ 225; and, party P3 230 can divide its value into two segments, such as, $\beta_3$, $\gamma_3$ 235.

Figure 2A:
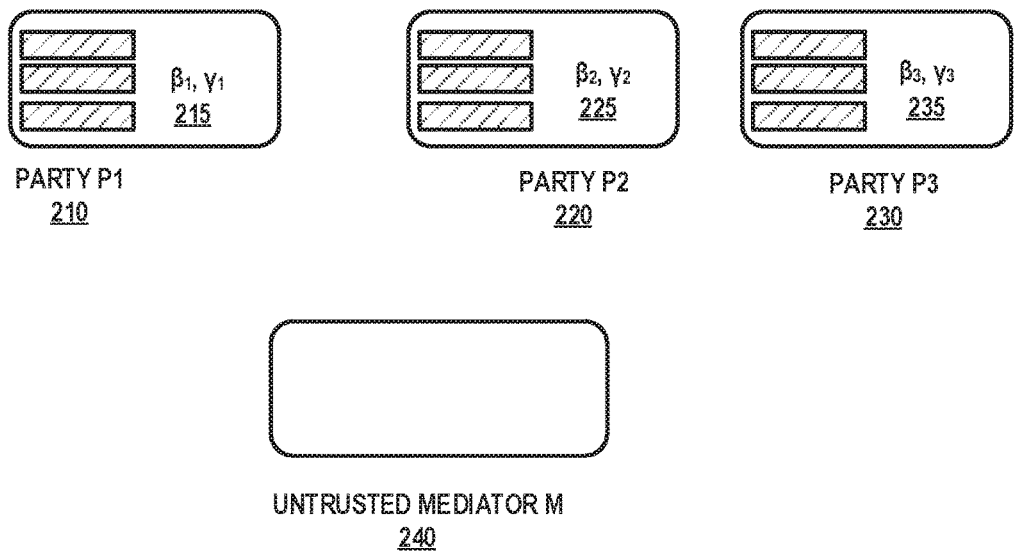
FIGS. 2A-2D are block diagrams illustrating data preparation in an example secure protocol used by the multiple parties and a non-trusted mediator to compute a global sum of data across the multiple parties in a multi-party environment while preserving their data privacy.

FIG. 2A illustrates an example segmentation of data by the parties. More generally, each party Pi shards its local sum into a number of segments. For instance, if party Pi shards its local sum Si into s segments, it generates secret shares $\alpha_{i1}, \alpha_{i2}, \ldots, \alpha_{is}$ uniformly randomly, such that $\Sigma_{j=1}^{s}\alpha_{ij}=1$ and for $1 \le j \le s$, $\alpha_{ij} > 0$. These shares are used to divide Pi's local sum Si into s segments $\alpha_{i1} \cdot S_i, \alpha_{i2} \cdot S_i, \ldots, \alpha_{is} \cdot S_i$ (denoted by elements of set $S_i = \{S_{i1}, S_{i2}, \ldots, S_{is}\}$ respectively), such that $S_i = \Sigma_{j=1}^{s} S_{ij}$.

Such segmentation helps make the protocol robust to prior knowledge attacks. For example, consider a scenario where there are only two honest parties (let the two parties be $P_1$ and $P_2$) among N parties, with the remaining (N−2) parties colluding with the mediator M. In case the adversary has prior knowledge that $P_1$'s local sum is typically greater than that of $P_2$, it is easy to identify $S_1$ and $S_2$ from the honest party's local sums. However, by using data segmentation where each segment is a random value, the adversary would not be able to map these segments with its party, making the protocol robust to such prior (or background) knowledge attacks.

The above segmentation approach can be replaced with alternate approaches. For example, the parties may determine a-priori a large random number R, where each party Pi generates s random numbers $\{r_{i1}, r_{i2}, \ldots, r_{is}\}$ from $[-R, R]$ such that $\Sigma_{j=i}^{s} r_{ij} = S_i$, $S_i$ being the local sum of party $P_i$.

Figure 2B:
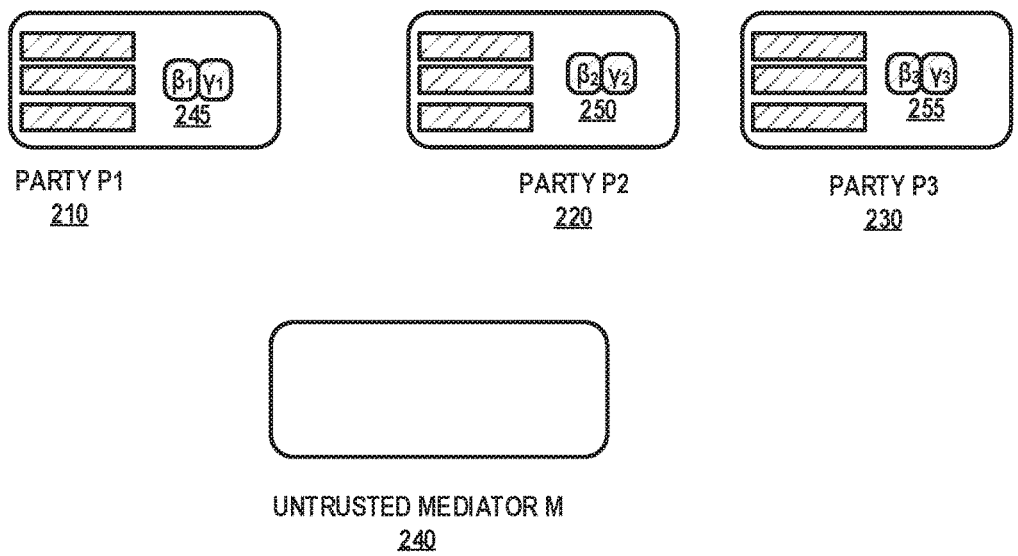
Figure 2C:
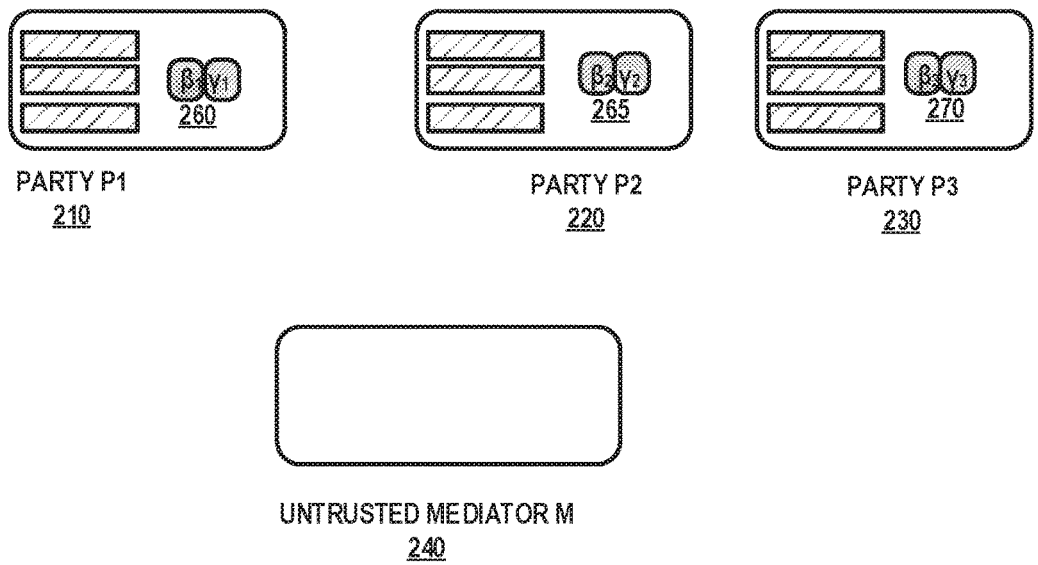

FIG. 2B-2C illustrate example encryptions of data. Specifically, FIG. 2B illustrates example encryption by the party Pi using the public key of mediator M 240. FIG. 2C illustrates example encryption of data by the party Pi using the public keys of the parties. In this example, each party Pi (P1 210, P2 220, or P3 230) may have a secret key and a public key, e.g., Ri and Yi respectively. Also, mediator M 240's secret key and public key may be $R_M$ and $Y_M$ respectively. The public keys of the parties and the mediator are known to each of the (N+1) entities.

During the encryption phase, each party Pi encrypts segments in set Si as follows: At first, mediator M 240 and the parties determine an order of the public keys, e.g., $[Y_M, Y_1, Y_2, \ldots Y_N]$ used during the encryption process. Generally, mediator M 240's public key is used to encrypt the data segments before the public key of any parties is used. The public keys of the parties can be used in any order. Next, Pi encrypts the segments in Si using the mediator M 240's public key that results in $S_i' = \{S_{i1}', S_{i2}', \ldots, S_{is}'\}$, where $S_{ij}' = E_{Y_M}[S_{ij}]$ or $S_i'[j] = E_{Y_M} S_i[j]$. As shown in FIG. 2B, party P1 210 can encrypt segments $\beta_1, \gamma_1$ with mediator M 240's public key $Y_M$ to obtain encrypted data 245. Similarly, party P2 220 can encrypt segments $\beta_2, \gamma_2$ with mediator M 240's public key $Y_M$ to obtain encrypted data 250. Likewise, party P3 230 can encrypt segments $\beta_3, \gamma_3$ with mediator M 240's public key $Y_M$ to obtain encrypted data 255.

Next, Pi can employ the public keys of the participating parties to the segments in $S_i'$ and generates $S_i''$ such that $S_i''[j] = [E_{Y2}[E_{Y1}[E_{YM}[S'[j]]]]]_{i=1 \text{ to } N}$. The encryption and decryption operations performed by the parties may follow a predetermined order. For illustration purposes only, here, it is assumed that the order of encryption/description is the same as the order of the parties' shared public keys. Therefore, encrypted data 245 is further encrypted using $Y_1, Y_2$, and $Y_3$ respectively by party P1 210 to obtain prepared data 260. Similarly, encrypted data 250 is further encrypted using $Y_1, Y_2$, and $Y_3$ respectively by party P2 220 to obtain prepared data 265; and, encrypted data 255 is further encrypted using $Y_1, Y_2$, and $Y_3$ respectively by party P3 230 to obtain prepared data 270.

Figure 2D:
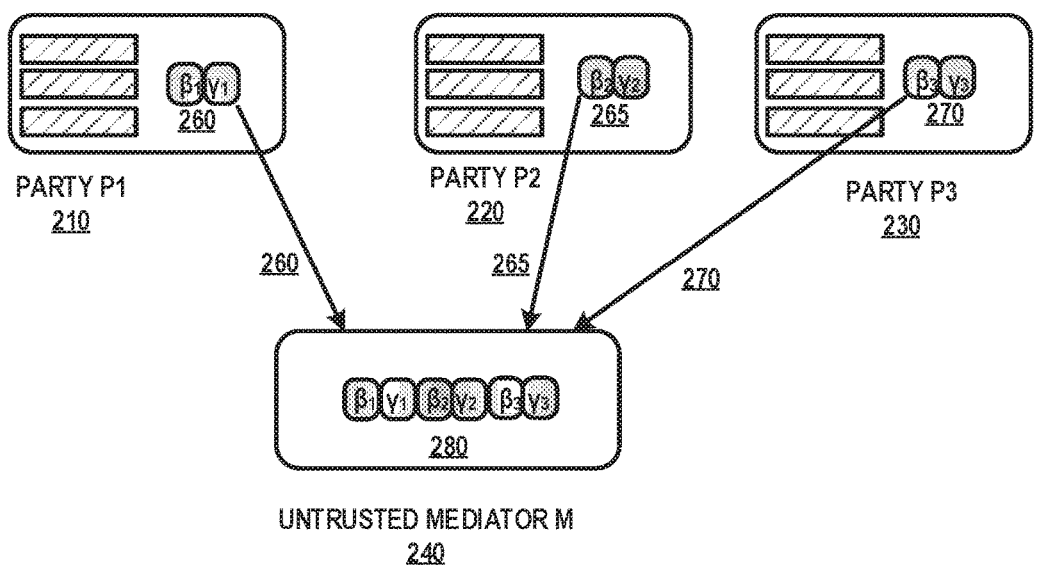

At the end of the encryption phase, as shown in FIG. 2D, each party Pi sends the prepared data set $S_i''$ (for example, prepared data 260 by party P1 210, prepared data 265 by party P2 220, and prepared data 270 by party P3 230) to the mediator M 240. Mediator M 240 receives prepared data from each party and put them together as prepared data 280, which is ready for further processing in the anonymization phase.

Anonymization

Figure 3A:
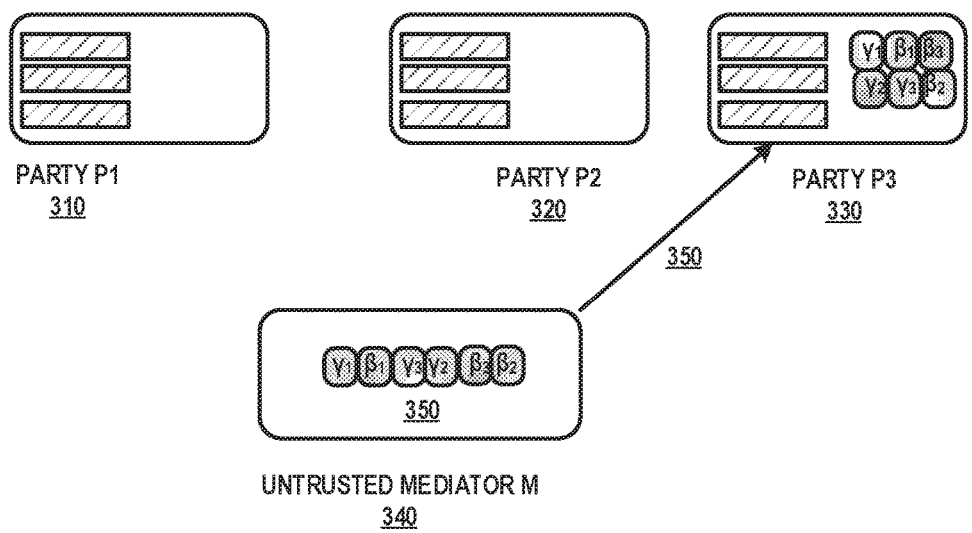
FIGS. 3A-3D are block diagrams illustrating anonymization in an example secure protocol used by the multiple parties and a non-trusted mediator to compute a global sum of data across the multiple parties in a multi-party environment while preserving their data privacy.

FIGS. 3A-3D are block diagrams illustrating anonymization in an example secure protocol used by the multiple parties (e.g., party P1 310, P2 320, and P3 330) and a non-trusted mediator (e.g., M 340) to securely computing a sum across the multiple parties in a multi-party environment while preserving the data privacy of each party. Non-trusted mediator M 340 may receive prepared data sets 350 $\Psi = \{S_1'', S_2'', \ldots, S_N''\}$. Note that the size of the set $\Psi$ is (N*s), because each party shards its local result into s segments. Since the encryption order is assumed to be from 1 to N, the appropriate decryption order would be from N to 1. Therefore, non-trusted mediator M 340 sends the set $\Psi$ to party $P_N$ in the first iteration. In some examples, the non-trusted mediator M 340 may shuffle the data first before sending to a party. As illustrated in FIG. 3A, prepared data set 350 is first sent to party P3 330 by non-trusted mediator M 340. Here, prepared data set 350 is encrypted with the public keys of $Y_M, Y_1, Y_2$, and $Y_3$. Party P3 330 can then update the prepared data set $\Psi$ 350 by decrypting the data set $\Psi$ 350 using the secret key of $R_3$, and randomly shuffling the data to obtain prepared data set $\Psi$ 360. Here, prepared data set $\Psi$ 360 is encrypted with the public keys of $Y_M, Y_1$ and $Y_2$.

Figure 3B:
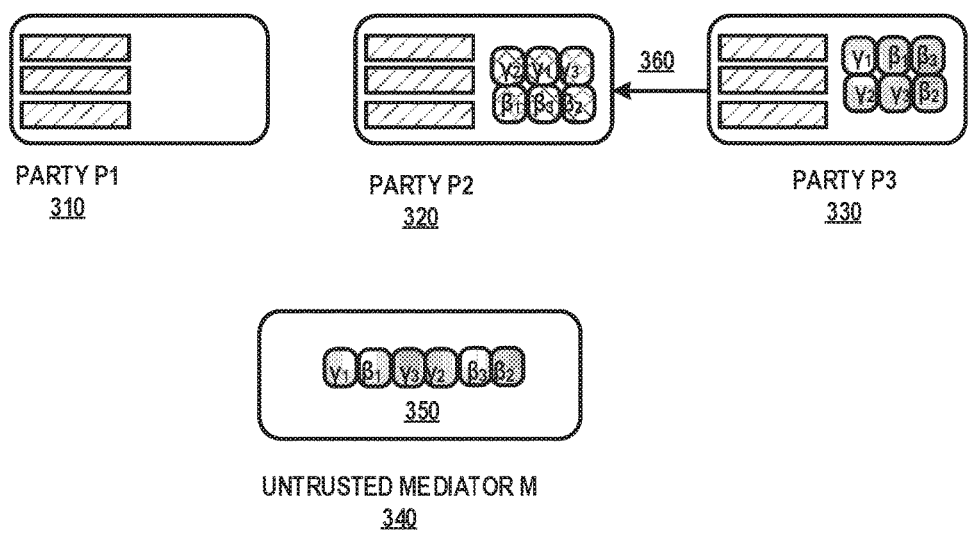

Thereafter, as illustrated in FIG. 3B, party P3 330 can send the updated $\Psi$ 360 to party $P_{N-1}$ (e.g., P2 320) for the next iteration. Upon receiving prepared data set 360, party P2 320 can also update the prepared data set $\Psi$ 360 by decrypting data set $\Psi$ 360 using the secret key of $R_2$, and randomly shuffling the data to obtain prepared data set $\Psi$ 370. Here, prepared data set $\Psi$ 370 is encrypted with the public keys of $Y_M$ and $Y_1$.

Figure 3C:
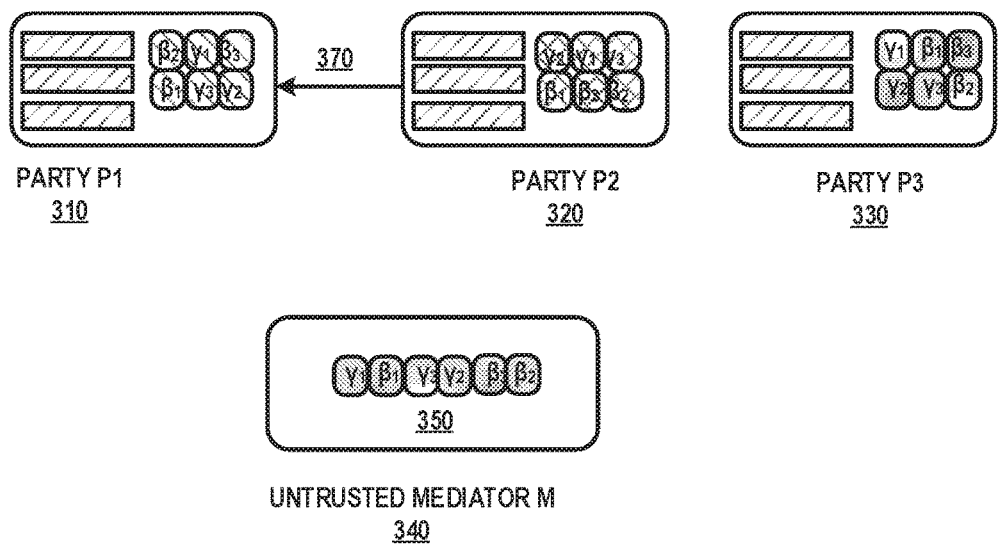

Next, as illustrated in FIG. 3C, party P2 320 can send the updated $\Psi$ 370 to party $P_{N-2}$ (e.g., P1 310) for the next iteration. Upon receiving prepared data set 370, party P1 310 can also update the prepared data set $\Psi$ 370 by decrypting data set $\Psi$ 370 using the secret key of $R_1$, and randomly shuffling the data to obtain prepared data set $\Psi$ 380. Party P1 310 can then send the prepared data set $\Psi$ 380 to non-trusted mediator M 340. Here, prepared data set $\Psi$ 370 is encrypted with the public key of $Y_M$.

Figure 3D:
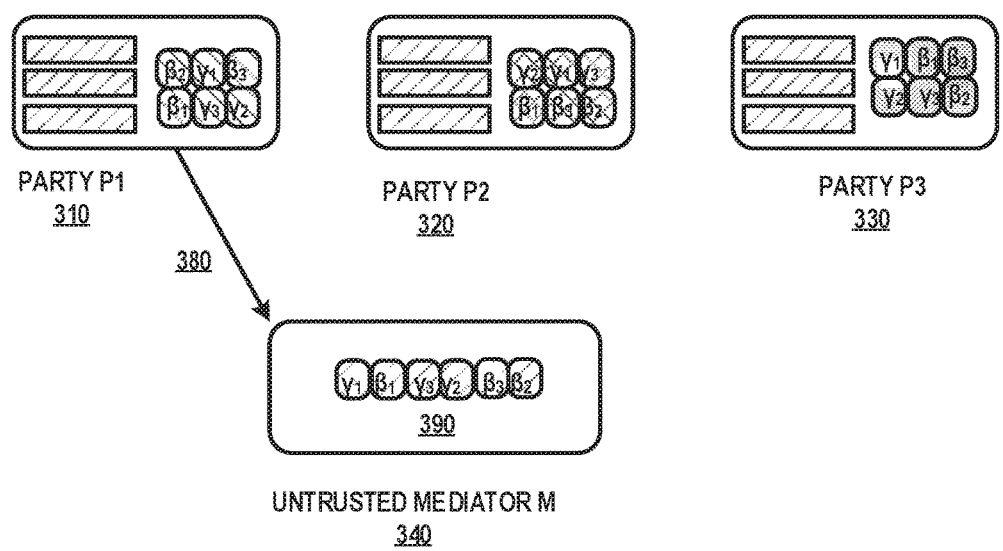

The iterations terminate when non-trusted mediator M 340 receives the updated data set 380 from party P1 310, as shown in FIG. 3D. Note that the random data set $\Psi$ that the mediator M receives from party $P_1$ at the end of the anonymization phase can be proven to be computationally indistinguishable as long as there are H honest parties such that H≥2. To prove collusion resistance, assume in a scenario where the mediator M collaborates with malicious parties $P_{MAL} \subseteq P$ such that $|P| - |P_{MAL}| = H$. To distinguish honest data segments from anonymized data, parties in $P_{MAL}$ could assist the mediator M by excluding their data segments $\Psi_{MAL}$. However, if the number of data segments for each party is s, and there are H honest parties, the probability that the mediator M is able to associate a data segment $S_D \in \{\Psi - \Psi_{MAL}\}$ with an honest party is $$\frac{s}{s*H},$$

or 1/H. Since H≥2, 1/H is at most ½. This implies that data segments in $\{\Psi - \Psi_{MAL}\}$ are computationally indistinguishable.

Non-trusted mediator M 340 can then decrypt the updated data set 380 using M 340's secret key $R_M$, and randomly shuffling the data to obtain updated data set 390. Here, updated data set 390 is unencrypted. Note that the order of decryption is in the reverse order of encryption. In some examples, non-trusted mediator M 340 may be the last entity to decrypt the updated data set 380 in the anonymization phase if, for instance, the order of encryption keys is $[Y_M, Y_1, Y_2, Y_3]$.

The following explains the steps in the (N−i+1)th iteration of the anonymization phase.

(a) Party Pi receives $\Psi$ either from mediator M (if i=N), or from party $P_{i+1}$ (if i≠N).

(b) Pi removes one layer of encryption from $\Psi$ as follows: $\Psi_1[k] = D_{R_i}[\Psi[k]]$ for $1 \leq k \leq (N*s)$.

(c) Pi randomly reorders the segments in $\Psi_i$ by using a random shuffle function $\pi$ and obtains a randomized data set $\Psi_i = \Psi_i[\pi(k)]$ for $1 \leq k \leq (N*s)$.

(d) Pi sends decrypted and shuffled $\Psi_i$ to the mediator M (if i=0) or to the party Pi□1 (if i≠0).

At the end of N iterations, the mediator M can receive the randomized data set that has at most one layer of encryption with public key $Y_M$.

Sum Computation

Figure 4A:
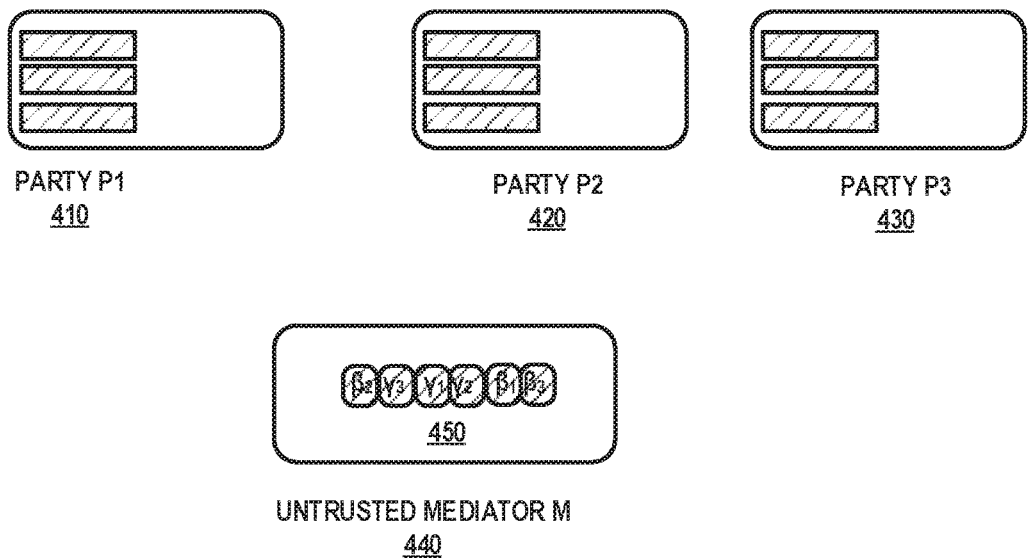
FIGS. 4A-4B are block diagrams illustrating sum computation in an example secure protocol used by the multiple parties and a non-trusted mediator to compute a global sum of data across the multiple parties in a multi-party environment while preserving their data privacy.
Figure 4B:
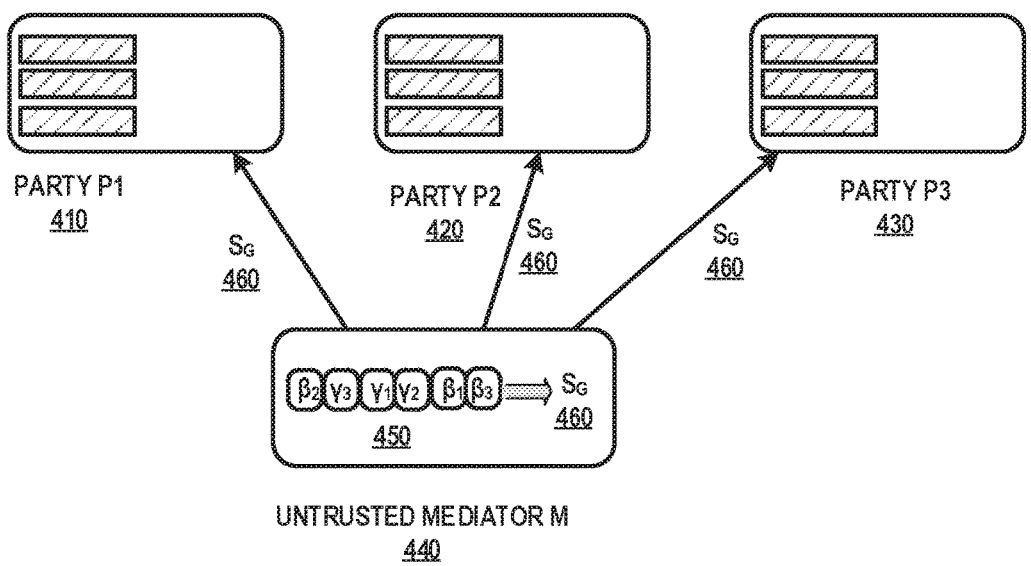

FIGS. 4A-4B are block diagrams illustrating sum computation in an example secure protocol used by the multiple parties (e.g., P1 410, P2 420, and P3 430) and a non-trusted mediator (e.g., M 440) to communicate a sum that preserves privacy of the multiple parties in a multi-party environment. As shown in FIG. 4A, if not performed during the anonymization phase, non-trusted mediator M 440 can first decrypt the data segments as $\Psi[k]=D_{R_M}[\Psi[k]]$ for $1 \le k \le (N*s)$. Then, non-trusted mediator M 440 can compute the sum of the segments in set $\Psi$ 450 to obtain the global sum $S_G$. Referring now to FIG. 4B, non-trusted mediator M 440 sends the value of $S_G$ 460 to the participating parties.

Figure 5:
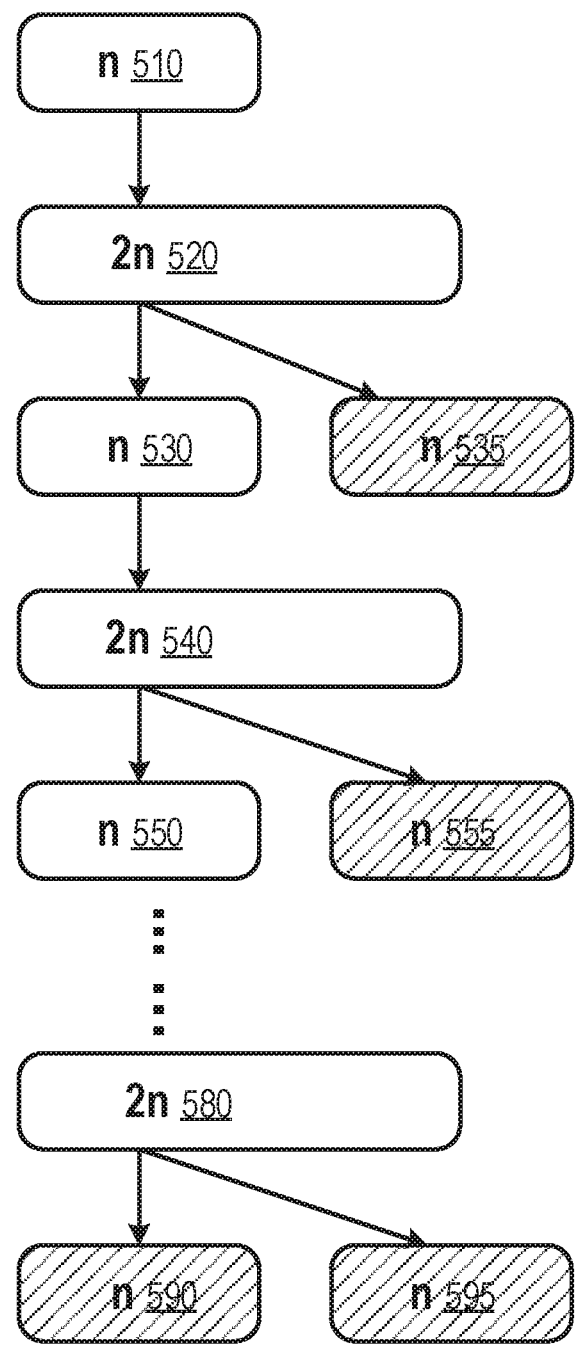
FIG. 5 is block diagram illustrating an example encryption with reduced computational complexity as used by the multiple parties and a non-trusted mediator.

FIG. 5 is block diagram illustrating an example encryption with reduced computational complexity as used by the multiple parties and a non-trusted mediator. In public key cryptography, the cipher text can grow exponentially with the number of encryptions. For instance, with Elgamal encryption, the cipher text size may double with the number of encryptions. Therefore, if there are N parties, N encryptions on a data segment of size n results in a cipher text of size $2^N * n$. In order to reduce the size of the end cipher text, the encryption process may be modified. The modified encryption can result in a cipher text size that grows linearly with the number of parties. Specifically, in this modified encryption, the first n bytes of the cipher text resulted by the first level encryption are encrypted in the second level encryption, whereas the second n bytes of the cipher text resulted by the first level encryption are not encrypted in the second level encryption.

Modified Encryption

Specifically, in the example shown in FIG. 5, the initial cipher text 510 has n bytes. After the first level encryption, the resulting cipher text 520 has 2n bytes. During the second level encryption, the first n bytes 530 are encrypted. However, the second n bytes 535 remains to be encrypted using the first level encryption. After applying the second level encryption on the first n bytes 530, the resulting cipher text 540 again has 2n bytes. Likewise, the first n bytes 550 are encrypted using the third level encryption, whereas the second n bytes 555 remains to be encrypted using the second level encryption. After N−1 number of recursive encryptions, the resulting cipher text 580 has 2n bytes. The first n bytes 590 are encrypted using the Nth level encryption, whereas the second n bytes 595 are encrypted using the (N−1)th level encryption. Therefore, although the end cipher text size with conventional encryption is $2^N * n$, the end cipher text size, which is indicated as shaded blocks in FIG. 5, is reduced to $(N+1)*n$. However, note that the decryption keys of all N parties will be used to decrypt the cipher text.

Enhanced Performance

The secure protocol disclosed herein has improved privacy, reduced communication cost and latency without compromising the accuracy of the sum. With regard to privacy, during the data preparation phase, each party can submit the encrypted data to the mediator. During the anonymization phase, each party can have access to a set of encrypted data which has N layers to 1 layer of encryption(s) (in N iterations, respectively) even after removing one layer of encryption with its own secret key. Therefore, it is not possible for a party to reveal the plain text of the data set even if (N−1) parties collude, which ensures confidentiality during the anonymization phase. During the sum computation phase, the mediator has access to the plain text of the data segments. However, it is not possible for the mediator to identify any association between a data segment and an honest party as long as there are at least two honest parties.

With regard to the communication cost, during the data preparation phase, each party can send its prepared data, which results in N number of communications. In the anonymization phase, the data set can be sent from mediator to the Nth party, and then to the other parties sequentially, which results in N number of communications. During the sum computation phase, the mediator can send the global sum $S_G$ to the participating parties, which results in N more communications. Therefore, the number of communications for each global sum computation is 3N, e.g., O(N).

With regard to the latency, in the data preparation phase, each party may encrypt each of its data segments (N+1) times. Therefore, each party performs $(N+1)*s$ encryptions, and the total number of encryptions for all participating parties in the data preparation phase is $N(N+1)*s$. In the anonymization phase, each party can remove one layer of encryption from each data segment. Therefore, each party may perform $(N*s)$ decryptions, and the total number of decryptions for the participating parties in the anonymization phase is $N^2 * s$. In the sum computation phase, the mediator M performs $N*s$ number of decryptions.

Note that, in the anonymization phase, the data set is anonymized sequentially. That is, while one party is anonymizing a data set, the other (N−1) parties cannot work on that data set simultaneously. In some examples, however, if the data has D dimensions, the secure protocol can be k-parallelizable, where k=min (N, D). Specifically, a unique order of parties can be formed for each dimension, and the data sets for each dimension can be encrypted and decrypted according to that unique order.

Figure 6:
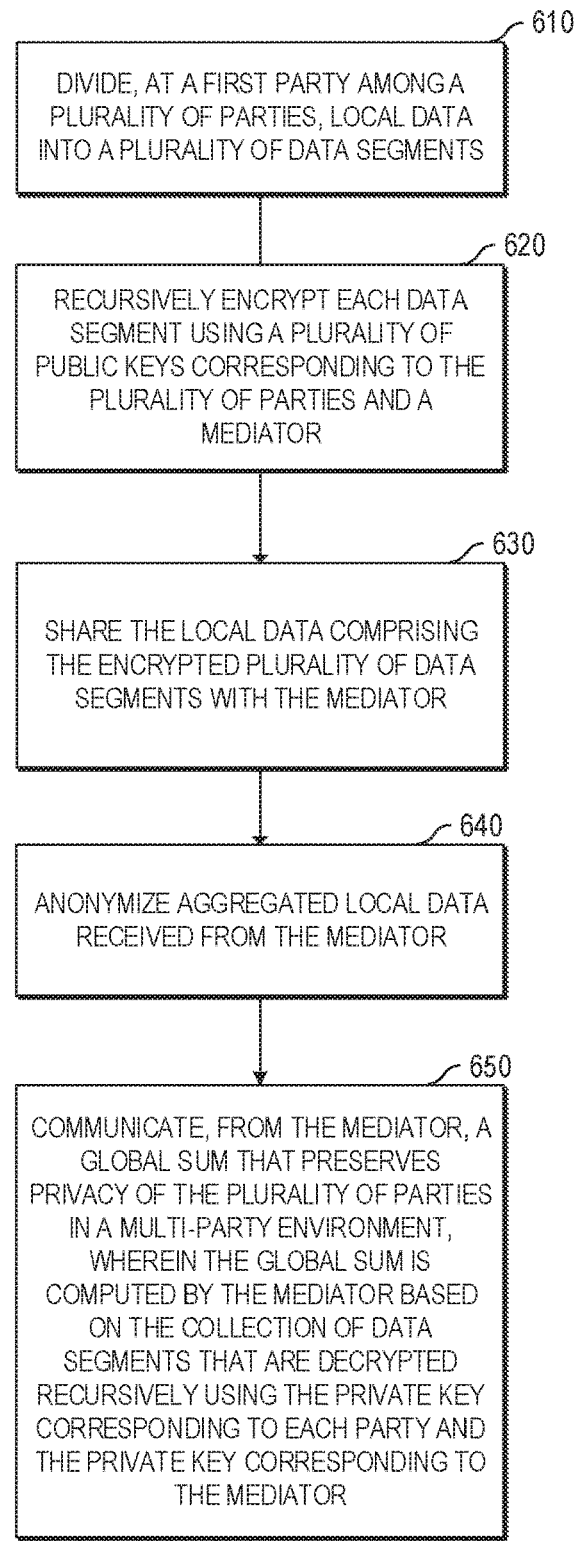
FIG. 6 is a flowchart of an example process to compute a global sum of data across the multiple parties in a multi-party environment while preserving their data privacy.

Process for Securely Computing a Sum Across Multiple Parties while Preserving Parties' Data Privacy FIG. 6 is a flowchart of an example process for securely computing a sum across multiple parties in a multi-party environment while preserving their data privacy. During operations, a computing device can divide, at a first party among a plurality of parties, local data into a plurality of data segments (operation 610). The computing device can then recursively encrypt each data segment using a plurality of public keys corresponding to the plurality of parties and a mediator (operation 620). Next, the computing device can share the local data comprising the encrypted plurality of data segments with the mediator (operation 630). Moreover, the computing device can anonymize aggregated local data received from the mediator (operation 640). Finally, the computing device can communicate a global sum that preserves privacy of the plurality of parties in a multi-party environment (operation 650). Here, the global sum may be computed by the mediator based on the collection of data segments that are decrypted recursively using the private key corresponding to each party and the private key corresponding to the mediator.

In some implementations, the computing device can share the local data by transmitting the encrypted plurality of segments to the mediator, and receiving a collection of data segments comprising the plurality of data segments collected by the mediator from each party.

In some implementations, the plurality of parties participate in data sharing under a semi-honest adversary model, in which each party follows an agreed-upon protocol while attempting to acquire information from private data during computation.

In some examples, anonymizing the aggregated local data further involves: decrypting a collection of data segments received from the mediator using the private key corresponding to the first party; shuffling the collection of data segments that are decrypted using the private key corresponding to the first party; and transmitting the shuffled collection of data segments to one of the plurality of parties and the mediator. In some examples, the collection of data segments may be further decrypted using other private keys corresponding to other parties in the plurality of parties following a predetermined priority order.

In some examples, the computing device can further generate a plurality of random numbers by the first party, and calculate a local sum corresponding to the first party by adding the plurality of random numbers.

In some examples, a cipher text size corresponding to the encrypted plurality of data segments is in a linear relationship (rather than an exponential relationship) with the number of the plurality of parties. Specifically, recursively encrypting each data segment may involve: encrypting each data segment using a first public key corresponding to the first party to obtain a first encrypted data segment; encrypting a subset of the first encrypted data segment using a second public key corresponding to a second party to obtain a second encrypted data segment; and encrypting a subset of the second encrypted data segment using a third public key corresponding to a third party to obtain a second encrypted data segment.

Figure 7:
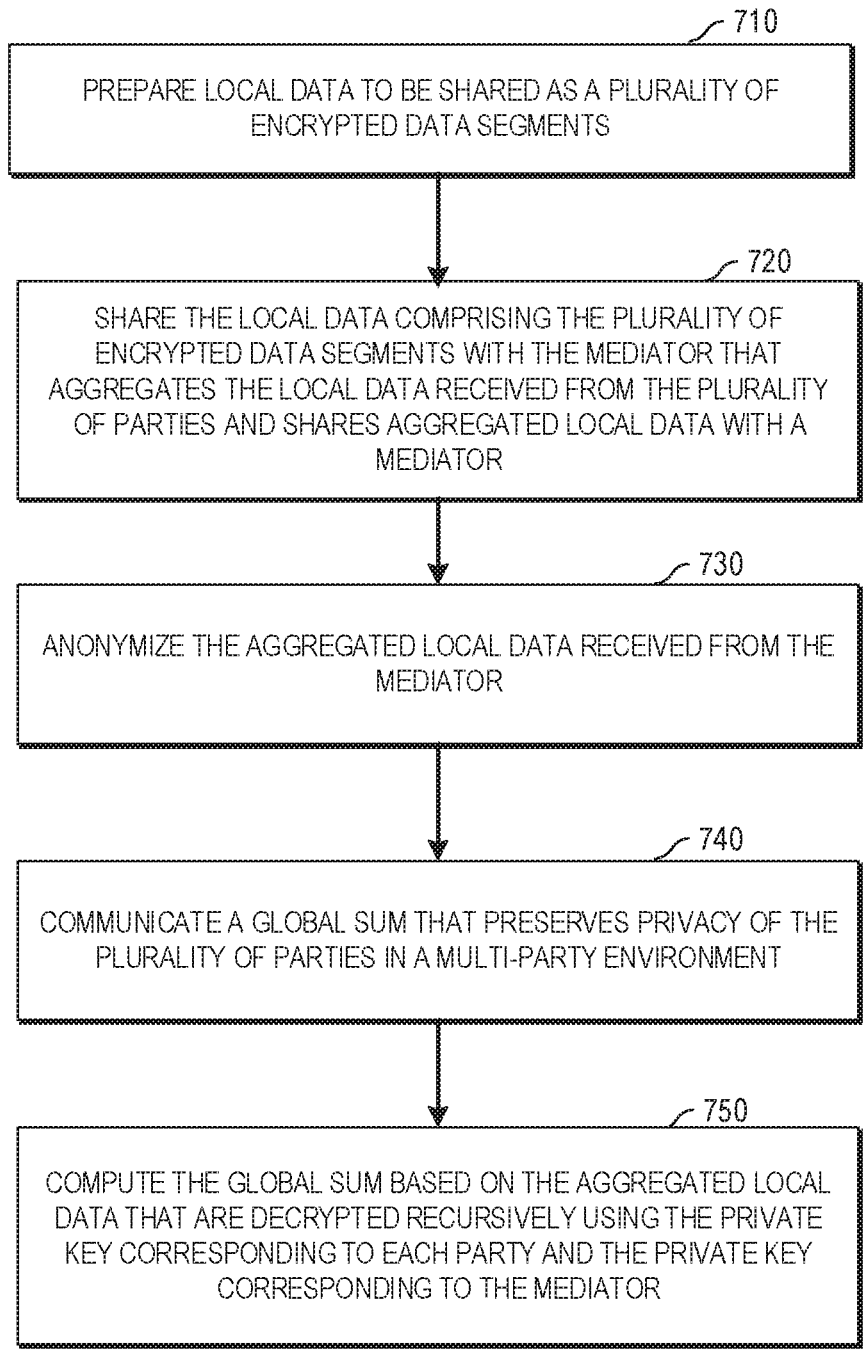
FIG. 7 is a flowchart of an example process to compute a global sum of data across the multiple parties in a multi-party environment while preserving their data privacy.

FIG. 7 is a flowchart of an example process for securely computing a sum across multiple parties in a multi-party environment while preserving their data privacy. The process involves a system including a plurality of computing devices associated with a plurality of parties participating in privacy-preserving data sharing under a semi-honest adversary model, and a mediator coupled to the plurality of parties to compute a global sum. During operations, each of the plurality of computing devices can prepare local data to be shared as a plurality of encrypted data segments (operation 710). Furthermore, each computing device can share the local data comprising the plurality of encrypted data segments with the mediator that aggregates the local data received from the plurality of parties and shares aggregated local data with a mediator (operation 720). Also, each computing device can anonymize the aggregated local data received from the mediator (operation 730). Then, each computing device can communicate a global sum that preserves privacy of the plurality of parties in a multi-party environment (operation 740). In addition, the mediator can compute the global sum based on the aggregated local data that are decrypted recursively using the private key corresponding to each party and the private key corresponding to the mediator (operation 750).

In some implementations, each computing device can further divide the local data into a plurality of data segments, and recursively encrypt each data segment using a plurality of public keys corresponding to the plurality of parties and the mediator. Also, each computing device may further transmit the encrypted plurality of segments to the mediator, and receive a collection of data segments comprising the plurality of data segments collected by the mediator from each party. Then, each computing device can decrypt a collection of data segments received from the mediator using the private key corresponding to the first party; shuffle the collection of data segments that are decrypted using the private key corresponding to the first party; and transmit the shuffled collection of data segments to another party or the mediator. Here, the collection of data segments may be further decrypted using other private keys corresponding to other parties in the plurality of parties following a predetermined priority order.

In some implementations, each computing device can generate a plurality of random numbers by the first party, and calculate a local sum corresponding to the first party by adding the plurality of random numbers.

Figure 8:
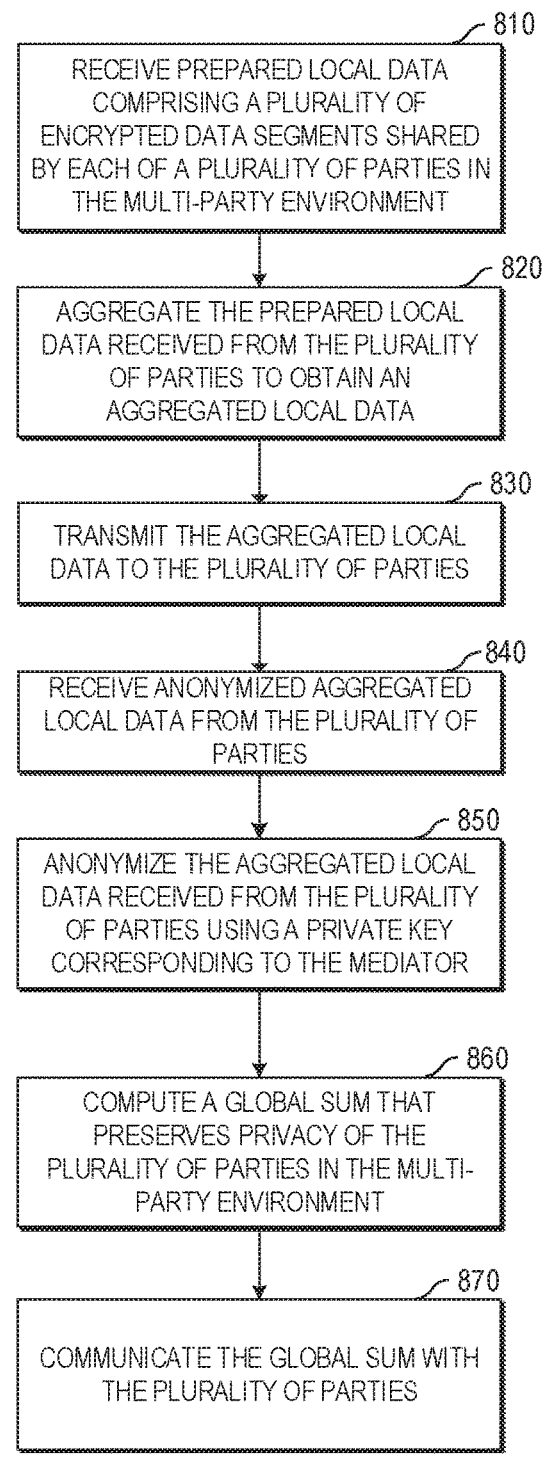
FIG. 8 is a flowchart of an example process to compute a global sum of data across the multiple parties in a multi-party environment while preserving their data privacy.

FIG. 8 is a flowchart of an example process for securely computing a sum across multiple parties in a multi-party environment while preserving their data privacy. During operations, a computing device can receive prepared local data comprising a plurality of encrypted data segments shared by each of a plurality of parties in the multi-party environment (operation 810). Moreover, the computing device can aggregate the prepared local data received from the plurality of parties to obtain an aggregated local data (operation 820). Further, the computing device can transmit the aggregated local data to the plurality of parties (operation 830). Also, the computing device can receive anonymized aggregated local data from the plurality of parties (operation 840). Next, the computing device can anonymize the aggregated local data received from the plurality of parties using a private key corresponding to the mediator (operation 850). Thereafter, the computing device can compute a global sum that preserves privacy of the plurality of parties in the multi-party environment (operation 860). Finally, the computing device can communicate the global sum with the plurality of parties (operation 870). In some examples, such operations may be performed by processor 910 executing instructions in a machine-readable storage medium 920, as illustrated in FIG. 9.

A special purpose computer is used to perform these operations that solve the issues with data privacy rooted in computer technology given the ease with which data is stored, transported, and retrieved. The present disclosure makes improvements to the working of the computer itself by implementing these operations. Thus, the disclosed features are advances in the field of distributed secure data sharing using a non-trusted mediator.

Machine Readable Storage Medium for Securely Computing a Sum Across Multiple Parties while Preserving their Data Privacy The present disclosure also may be embedded in a non-transitory computer-readable storage medium (e.g., a programmable circuit; a semiconductor memory such as a volatile memory such as random access memory "RAM," or non-volatile memory, such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Figure 9:
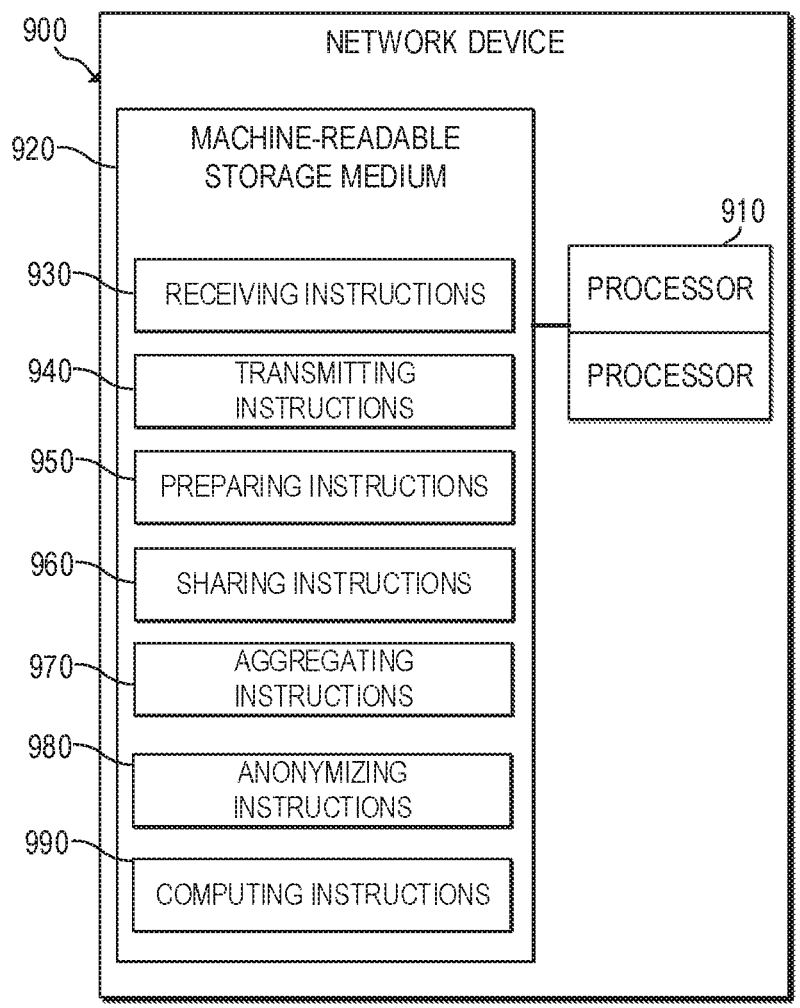
FIG. 9 is a block diagram of an example network device for securely computing a global sum of data across the multiple parties in a multi-party environment while preserving their data privacy.

FIG. 9 is a block diagram of an example network device for securely computing a sum across multiple parties in a multi-party environment while preserving their data privacy. Network device 900 generally includes a device suitable for securely computing a sum across multiple parties in a multi-party environment while preserving their data privacy.

As illustrated in FIG. 9, network device 900 may include one or more processors 910 and a machine-readable storage medium 920.

Processor 910 may be one or more central processing units (CPUs), CPU cores, semiconductor-based microprocessors, and/or other hardware devices suitable for retrieval and execution of instructions stored in machine-readable storage medium 920. Processor 910 may fetch, decode, and execute one or more of receiving instructions 930, transmitting instructions 940, preparing instructions 950, sharing instructions 960, aggregating instructions 970, anonymizing instructions 980, and computing instructions 990 to control the process for communicating a sum that preserves privacy of parties in a multi-party environment. As an alternative or in addition to retrieving and executing instructions, processor 910 may include one or more electronic circuits that include electronic components for performing the functionality of one or more of instructions 930-990.

Machine-readable storage medium 920 in network device 900 may include only a subset of instructions 930-990, depending on the role of network device 900 in the distributed system. For example, the distributed system may include two kinds of devices, e.g., parties and the non-trusted mediator. Network device 900 acting as the non-trusted mediator may not include preparing instructions 950 for preparing data set. It may include aggregating instructions 970 for aggregating received data set. On the other hand, network device 900 acting as a party may include preparing instructions 950. Moreover, computing instructions 990 may instruct processors 910 to perform different operations. For example, when network device 900 acts as a non-trusted mediator, computing instructions 990 may instruct processors 910 to calculate a global sum. However, when network device 900 acts as a party, computing instructions 990 may instruct processors 910 to perform local statistics computations. Therefore, the set of instructions on network devices disclosed herein may be different depending on whether an entity takes the role of a party or a mediator. In some implementations, the set of instructions can be the same on all network devices when an entity can act as both a party and a mediator.

Machine-readable storage medium 920 may be any electronic, magnetic, optical, or other physical storage device that contains or stores executable instructions. Thus, machine-readable storage medium 920 may be, for example, Random Access Memory (RAM), an Electrically Erasable Programmable Read-Only Memory (EEPROM), a storage device, an optical disc, and the like. In some implementations, machine-readable storage medium 920 may be a non-transitory storage medium, where the term "non-transitory" does not encompass transitory propagating signals.

As described in details below, non-transitory machine-readable storage medium 920 may be encoded with a series of executable instructions 930-990 to: prepare local data to be shared as a plurality of encrypted data segments; divide local data into a plurality of data segments at a party among a plurality of parties; recursively encrypt each data segment using a plurality of public keys corresponding to the plurality of parties and a mediator; encrypt each data segment using a first public key corresponding to the first party to obtain a first encrypted data segment; encrypt a subset of the first encrypted data segment using a second public key corresponding to a second party to obtain a second encrypted data segment; encrypt a subset of the second encrypted data segment using a third public key corresponding to a third party to obtain a second encrypted data segment; generate a plurality of random numbers by the first party; calculate a local sum corresponding to the first party by adding the plurality of random numbers; share the local data comprising the encrypted plurality of data segments with the mediator; transmit the encrypted plurality of segments to the mediator; etc.

Also, non-transitory machine-readable storage medium 920 may be encoded with a series of executable instructions 930-990 further to: receive a collection of data segments comprising the plurality of data segments collected by the mediator from each party; anonymize aggregated local data received from the mediator; decrypt a collection of data segments received from the mediator using the private key corresponding to the first party; shuffle the collection of data segments that are decrypted using the private key corresponding to the first party; transmit the shuffled collection of data segments to one of the plurality of parties and the mediator; receive prepared local data comprising a plurality of encrypted data segments shared by each of a plurality of parties in the multi-party environment; aggregate the prepared local data received from the plurality of parties to obtain an aggregated local data; transmit the aggregated local data to the plurality of parties; receive anonymized aggregated local data from the plurality of parties; anonymize the aggregated local data received from the plurality of parties using a private key corresponding to the mediator; compute a global sum that preserves privacy of the plurality of parties in the multi-party environment based on the collection of data segments that are decrypted recursively using the private key corresponding to each party and the private key corresponding to the mediator; communicate the global sum with the plurality of parties, whereas the global sum preserves privacy of the plurality of parties to the plurality of parties in a multi-party environment; etc.

The foregoing disclosure describes a number of example implementations for securely computing a sum across multiple parties in a multi-party environment while preserving their data privacy. As detailed above, example implementations provide an intuitive, discoverable mechanism for securely computing a sum across multiple parties in a multi-party environment. Additional implementations and advantages of such implementations will be apparent to those of skill in the art upon reading and understanding the foregoing description.

The invention claimed is:

1. A method comprising:
dividing, by a computing device at a first party among a plurality of parties, local data into a plurality of data segments;
recursively encrypting, by the computing device, each of the plurality of data segments using a plurality of public keys corresponding to the plurality of parties and a mediator to obtain encrypted local data;
sharing, by the computing device, the encrypted local data comprising a plurality of encrypted data segments with the mediator;
anonymizing, by the computing device, aggregated local data received from the mediator; and
receiving, by the computing device from the mediator, a global sum that preserves privacy of the plurality of parties in a multi-party environment, wherein the global sum is computed by the mediator based on a collection of data segments that are decrypted recursively using a private key corresponding to each of a plurality of parties and a private key corresponding to the mediator.

2. The method of claim 1, wherein sharing the encrypted local data further comprises:

transmitting, by the computing device, the encrypted local data to the mediator; and receiving, by the computing device, a collection of data segments comprising a plurality of data segments collected by the mediator from each of a plurality of parties.

3. The method of claim 1, wherein the plurality of parties participate in data sharing under a semi-honest adversary model in which each of a plurality of parties follows an agreed-upon protocol while attempting to acquire information from private data during computation.

4. The method of claim 1, wherein anonymizing the aggregated local data further comprises:

decrypting, by the computing device, the collection of data segments received from the mediator using a private key corresponding to the first party;

shuffling, by the computing device, the collection of data segments that are decrypted using the private key corresponding to the first party; and transmitting, by the computing device, the shuffled collection of data segments to one of the plurality of parties and the mediator.

5. The method of claim 4, wherein the collection of data segments is further decrypted using other private keys corresponding to other parties in the plurality of parties following a predetermined priority order.

6. The method of claim 1, further comprising:

generating, by the computing device, a plurality of random numbers by the first party; and calculating, by the computing device, a local sum corresponding to the first party by adding the plurality of random numbers.

7. The method of claim 1, wherein a cipher text size corresponding to the encrypted local data is in a linear relationship with the number of the plurality of parties.

8. The method of claim 7, wherein recursively encrypting each of the plurality of data segments comprises:

encrypting each of the plurality of data segments using a first public key corresponding to the first party to obtain a first encrypted data segment;

encrypting a subset of the first encrypted data segment using a second public key corresponding to a second party to obtain a second encrypted data segment; and encrypting a subset of the second encrypted data segment using a third public key corresponding to a third party to obtain a second encrypted data segment.

9. A system comprising:

a plurality of computing devices associated with a plurality of parties participating in privacy-preserving data sharing under a semi-honest adversary model, each of the plurality of computing devices comprising a hardware processor to:

divide local data into a plurality of data segments;

recursively encrypt each of the plurality of data segments using a plurality of public keys corresponding to the plurality of parties and a mediator to obtain encrypted local data;

share the encrypted local data comprising a plurality of encrypted data segments with the mediator;

anonymize aggregated local data received from the mediator; and communicate a global sum that preserves privacy of the plurality of parties in a multi-party environment, wherein the global sum is computed by the mediator based on a collection of data segments that are decrypted recursively using a private key corresponding to each of a plurality of parties and a private key corresponding to the mediator, and wherein the mediator comprises a hardware processor.

10. The system of claim 9, wherein the mediator aggregates the encrypted local data received from the plurality of parties to obtain an aggregated local data, and shares the aggregated local data.

11. The system of claim 9, wherein each of the plurality of computing devices comprising the hardware processor further to:

transmit the encrypted local data to the mediator; and receive a collection of data segments comprising a plurality of data segments collected by the mediator from each of a plurality of parties.

12. The system of claim 9, wherein each of the plurality of computing devices comprising the hardware processor further to:

decrypt a collection of data segments received from the mediator using a private key corresponding to the first party;

shuffle the collection of data segments that are decrypted using the private key corresponding to the first party; and transmit the shuffled collection of data segments to another party or the mediator.

13. The system of claim 12, wherein the collection of data segments is further decrypted using other private keys corresponding to other parties in the plurality of parties following a predetermined priority order.

14. The system of claim 9, wherein each of the plurality of computing devices comprising the hardware processor further to:

generate a plurality of numbers by the first party; and calculate a local sum corresponding to the first party by adding the plurality of numbers.

15. The system of claim 9, wherein a cipher text size corresponding to the encrypted local data is in a linear relationship with the number of the plurality of parties.

16. A non-transitory machine-readable storage medium encoded with instructions executable by at least one processor of a computing device associated with a mediator in a multi-party environment, the machine-readable storage medium comprising instructions to:

receive encrypted local data comprising a plurality of encrypted data segments shared by each of a plurality of parties in the multi-party environment, wherein local data are divided into a plurality of data segments at each of the plurality of parties, and wherein each of the plurality of data segments is recursively encrypted using a plurality of public keys corresponding to the plurality of parties and the mediator to obtain encrypted local data;

aggregate encrypted local data received from the plurality of parties to obtain an aggregated local data;

transmit the aggregated local data to the plurality of parties that anonymize the aggregated local data;

receive anonymized aggregated local data from the plurality of parties;

anonymize the anonymized aggregated local data received from the plurality of parties using a private key corresponding to the mediator;

compute a global sum that preserves privacy of the plurality of parties in the multi-party environment based on a collection of data segments that are decrypted recursively using a private key corresponding to each of a plurality of parties and the private key corresponding to the mediator; and communicate the global sum with the plurality of parties.

17. The non-transitory machine-readable storage medium of claim 16, wherein each of the plurality of parties further performs:
   transmitting encrypted local data to the mediator; and
   receiving a collection of data segments comprising a plurality of data segments collected by the mediator from each of a plurality of parties.

18. The non-transitory machine-readable storage medium of claim 16, wherein the machine-readable storage medium further comprising instructions to
   decrypt a collection of data segments using the private key corresponding to the mediator;
   shuffle the collection of data segments that are decrypted using the private key corresponding to the mediator; and
   compute the global sum using the shuffled collection of data segment.

* * * * *